United States Patent
Naruse et al.

(10) Patent No.: US 11,407,313 B2
(45) Date of Patent: Aug. 9, 2022

(54) POWER SUPPLY CIRCUIT

(71) Applicants: DENSO ELECTRONICS CORPORATION, Anjo (JP); TOYOTA JIDOSHA KABUSHIKI KAISHA, Toyota (JP)

(72) Inventors: Yasuo Naruse, Anjo (JP); Manabu Morita, Anjo (JP); Jiro Ito, Toyota (JP); Yoshio Nishino, Toyota (JP)

(73) Assignees: DENSO ELECTRONICS CORPORATION, Aichi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/183,400

(22) Filed: Feb. 24, 2021

(65) Prior Publication Data

US 2021/0268909 A1 Sep. 2, 2021

(30) Foreign Application Priority Data

Feb. 28, 2020 (JP) .............................. JP2020-033009

(51) Int. Cl.
| | | |
|---|---|---|
| *H01H 9/30* | (2006.01) | |
| *H02H 7/22* | (2006.01) | |
| *B60L 3/04* | (2006.01) | |
| *H01H 47/02* | (2006.01) | |
| *B60R 16/023* | (2006.01) | |
| *B60R 16/03* | (2006.01) | |

(52) U.S. Cl.
CPC .............. *B60L 3/04* (2013.01); *B60R 16/023* (2013.01); *B60R 16/0315* (2013.01); *H01H 47/02* (2013.01)

(58) Field of Classification Search
CPC .. B60R 16/0315; B60R 16/023; H01H 47/02; B60L 3/04
See application file for complete search history.

(56) References Cited

U.S. PATENT DOCUMENTS

| | | | | |
|---|---|---|---|---|
| 7,446,428 B2 * | 11/2008 | Sugimura | .......... | G01R 31/3278 307/10.6 |
| 9,806,517 B2 * | 10/2017 | Mo | ........................ | H02H 7/222 |
| 9,889,839 B2 * | 2/2018 | Iwagami | ............... | B60W 10/06 |
| 2003/0075980 A1 * | 4/2003 | Yoshida | .............. | B60R 16/0315 307/9.1 |
| 2004/0257732 A1 * | 12/2004 | Yoshida | .............. | B60R 16/0315 361/62 |
| 2015/0314741 A1 | 11/2015 | Ueta et al. | | |

FOREIGN PATENT DOCUMENTS

| | | |
|---|---|---|
| JP | 9226451 | 9/1997 |
| JP | 2004-352249 A | 12/2004 |
| JP | 2012-034550 A | 2/2012 |
| JP | 2014141142 A | 8/2014 |

* cited by examiner

*Primary Examiner* — Jared Fureman
*Assistant Examiner* — Esayas G Yeshaw
(74) *Attorney, Agent, or Firm* — Harness, Dickey & Pierce, P.L.C.

(57) ABSTRACT

A power supply circuit for supplying power to an electric load of a vehicle includes a relay and a relay control circuit. The relay is configure to be turned on when enabling the supply of power to the electric load and configured to be turned off when interrupting the supply of power to the electric load. The relay control circuit is configured to turn on the relay when an ignition of the vehicle is on regardless of a state of an operation part that is to be operated by a driver to operate the electric load.

5 Claims, 2 Drawing Sheets

POWER SUPPLY CIRCUIT

CROSS REFERENCE TO RELATED APPLICATION

The present application claims the benefit of priority from Japanese Patent Application No. 2020-033009 filed on Feb. 28, 2020. The entire disclosure of the above application is incorporated herein by reference.

TECHNICAL FIELD

The present disclosure relates to a power supply circuit that supplies power to an electric load of a vehicle.

BACKGROUND

Conventionally, there has been known a relay module that receives a driving signal from a control electronic control unit (ECU) and supplies power to an electric load of a vehicle.

SUMMARY

The present disclosure provides a power supply circuit for supplying power to an electric load of a vehicle. The power supply circuit includes a relay and a relay control circuit. The relay is configure to be turned on when enabling the supply of power to the electric load and configured to be turned off when interrupting the supply of power to the electric load. The relay control circuit is configured to turn on the relay when an ignition of the vehicle is on regardless of a state of an operation part that is to be operated by a driver to operate the electric load.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
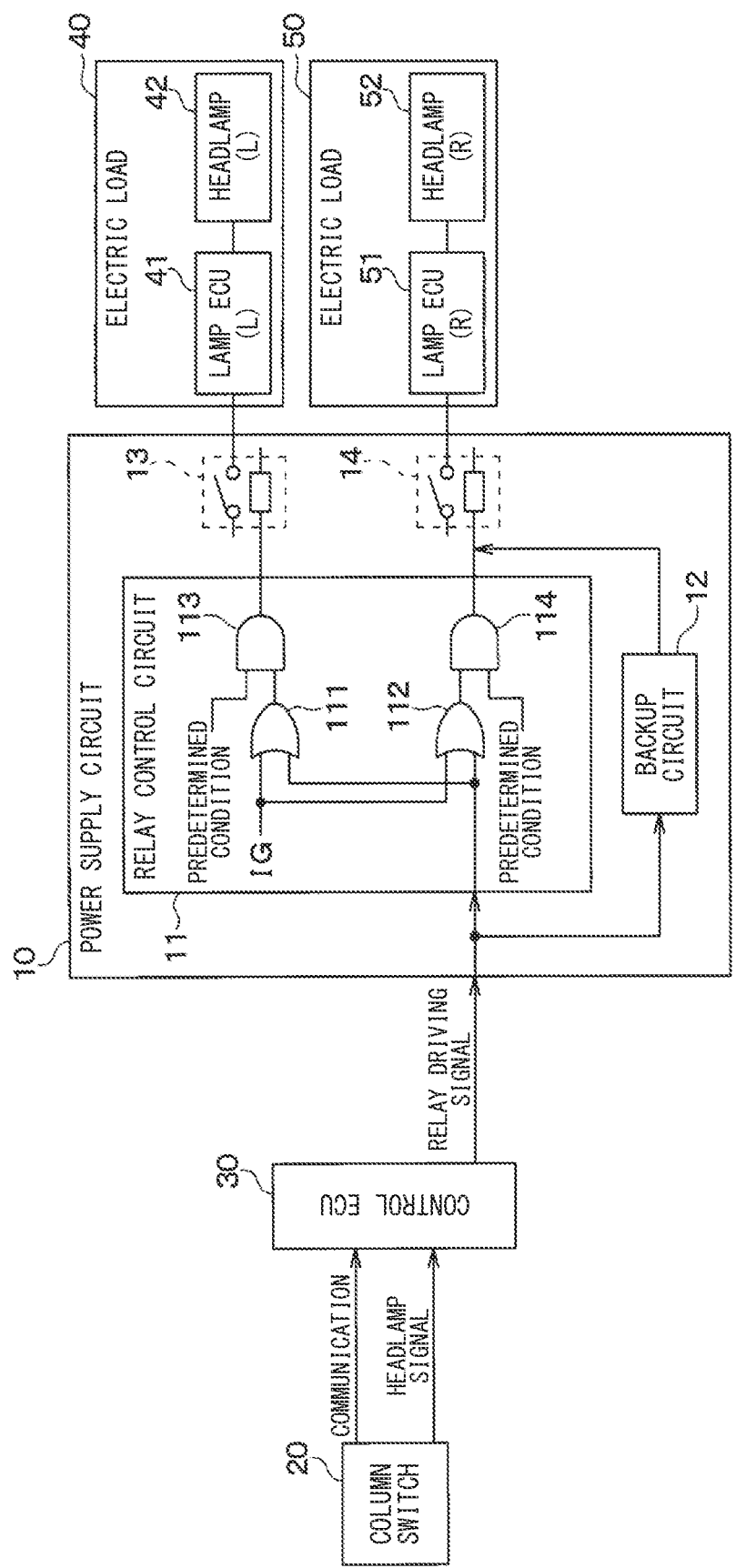
FIG. 1 is a block diagram of a power supply circuit according to a first embodiment.

A headlamp ECU as an electric load may be supplied with power by independent left and right relays from a viewpoint of fail-safe, and the left and right relays may be connected to a control ECU via left and right independent relay driving signal lines, respectively. However, in such a configuration, the number of required wire harnesses increases and the system cost increases by arranging the left and right independent relay driving signal lines.

According to an aspect of the present disclosure, a power supply circuit for supplying power to an electric load of a vehicle includes a relay and a relay control circuit. The relay is configured to be turned on when enabling the supply of power to the electric load, and configured to be turned off when interrupting the supply of power to the electric load. The relay control circuit is configured to control the relay, and configure to turn on the relay when an ignition of the vehicle is on regardless of a state of an operation part that is to be operated by a driver to operate the electric load.

According to the above configuration, when the ignition is on, the state of the electric load is controlled regardless of the state of the operation part, so that only one wire harness for redundancy is required for a relay driving signal line. Therefore, it is possible to simplify the arrangement of the wire harness.

Hereinafter, embodiments of the present disclosure will be described with reference to the drawings. In the following embodiments, the same or equivalent parts are denoted by the same reference numerals.

First Embodiment

A first embodiment will be described. A power supply circuit of the present embodiment supplies power to a headlamp electronic control unit (ECU) of a vehicle. As shown in FIG. 1, the power supply circuit 10 is connected to a column switch 20 as an operation part and a control ECU 30. The power supply circuit 10 is connected to electric loads 40 and 50 each including a headlamp ECU and a headlamp. The power supply circuit 10 supplies power to the electric loads 40 and 50 according to a signal transmitted from the control ECU 30 and the like.

The column switch 20 is operated by a driver to control states of the headlamps and the like, and is arranged in a vehicle interior together with the control ECU 30. The column switch 20 is connected to the control ECU 30 by a wire harness, and a signal corresponding to a state of the column switch 20 is transmitted from the column switch 20 to the control ECU 30.

The column switch 20 is connected to the control ECU 30 by two wire harnesses and communication is performed from the column switch 20 to the control ECU 30 through one of the wire harnesses. Then, a headlamp signal for redundancy is transmitted from the column switch 20 to the control ECU 30 through the other of the wire harnesses, and the headlamp signal is used when communication by the one of the wire harnesses is interrupted.

The control ECU 30 controls the power supply circuit 10 according to the signal transmitted from the column switch 20. The control ECU 30 is connected to the power supply circuit 10 by a wire harness, and a signal for controlling the power supply circuit 10 is transmitted from the control ECU 30 to the power supply circuit 10. In the present embodiment, the control ECU 30 and the power supply circuit 10 are connected by one wire harness.

The electric load 40 is a mechatronic integrated module including a headlamp ECU (LAMP ECU) 41 and a headlamp 42. The electric load 50 is a mechatronic integrated module including a headlamp ECU (LAMP ECU) 51 and a headlamp 52.

The headlamp ECUs 41 and 51 are ECUs that control the left and right headlamps 42 and 52, respectively. When power is supplied to the headlamp ECUs 41 and 51 from the power supply circuit 10, the left and right headlamps 42 and 52 are turned on by the headlamp ECUs 41 and 51, The power supply circuit 10 and the headlamp ECUs 41 and 51 are arranged in an engine compartment.

As shown in FIG. 1, the power supply circuit 10 is a relay module including a relay control circuit 11, a backup circuit 12, a relay 13, and a relay 14. The signal transmitted from the control ECU 30 to the power supply circuit 10 is input to the relay control circuit 11 and the backup circuit 12.

The relay control circuit 11 is a control integrated circuit (IC) that switches the relay 13 and the relay 14 on and off according to the signal transmitted from the control ECU 30. The backup circuit 12 is provided for fail-safe when the relay control circuit 11 has a fault, and is configured to switch the relay 14 on and off according to the signal transmitted from the control ECU 30.

The relays 13 and 14 switch the power supply to the headlamp ECUs 41 and 51 on and off, respectively, and are arranged so as to open and close the connection between a power supply (not shown) and the headlamp ECUs 41 and 51.

The relay control circuit 11 of the present embodiment turns on the relays 13 and 14 to supply power to the headlamp ECUs 41 and 51 when an ignition of the vehicle is turned on or when the column switch 20 instructs the lightning of the headlamps.

Specifically, the relay control circuit 11 includes an OR circuit 111, an OR circuit 112, an AND circuit 113, and an AND circuit 114. Two input terminals of the OR circuit 111 are connected to an ignition power supply of the vehicle and the control ECU 30, respectively. When the ignition is turned on or when a signal instructing the lighting of the headlamps is input from the control ECU 30, an output of the OR circuit 111 becomes a high level.

Similarly, two input terminals of the OR circuit 112 are connected to the ignition power supply of the vehicle and the control ECU 30, respectively. When the ignition is turned on or when the signal instructing the lighting of the headlamps is input from the control ECU 30, an output of the OR circuit 112 becomes a high level.

Two input terminals of the AND circuit 113 are connected to the OR circuit 111 and a sensor ECU (not shown), respectively. Then, when the signal at the high level is input from the OR circuit 111 and a predetermined condition is satisfied, an output of the AND circuit 113 becomes a high level. The predetermined condition is, for example, that there is no instruction to turn off the headlamp 42. When the output of the AND circuit 113 becomes the high level, the relay 13 is turned on, power is supplied to the headlamp ECU 41, and the left headlamp 42 is turned on.

Similarly, two input terminals of the AND circuit 114 are connected to the OR circuit 112 and a sensor ECU (not shown), respectively. Then, when the signal at the high level is input from the OR circuit 112 and a predetermined condition is satisfied, an output of the AND circuit 114 becomes a high level. When the output of the AND circuit 114 becomes the high level, the relay 14 is turned on, power is supplied to the headlamp ECU 51, and the right headlamp 52 is turned on.

The output of the backup circuit 12 becomes the high level when the predetermined condition is satisfied and the signal instructing the lighting of the headlamps is input from the control ECU 30, As a result, the relay 14 is turned on, power is supplied to the headlamp ECU 51, and the right headlamp 52 is turned on.

The operation of the power supply circuit 10 will be described. First, the operation in the normal state in which the relay control circuit 11 has no fault will be described. When the ignition of the vehicle is on in the normal state, a high level signal is input to the OR circuit 111 and the OR circuit 112 from a circuit connected to the ignition power supply. Therefore, the outputs of the OR circuit 111 and the OR circuit 112 are at the high level regardless of the state of the column switch 20. If the predetermined conditions are also satisfied, the outputs of the AND circuits 113 and 114 become high level, the relays 13 and 14 are turned on, power is supplied to the headlamp ECUs 41 and 51, and the left and right headlamps 42, 52 are turned on.

When the ignition is off in the normal state, the relay control circuit 11 operates according to the driving signal transmitted from the control ECU 30. That is, when the driving signal is at the high level, the outputs of the OR circuits 111 and 112 are at the high level. Therefore, if the predetermined conditions are also satisfied, the outputs of the AND circuits 113 and 114 are at the high level and the relays 13 and 14 are turned on. As a result, power is supplied to the headlamp ECUs 41 and 51, and the left and right headlamps 42 and 52 are turned on. Further, when the driving signal is at the low level, the outputs of the OR circuits 111 and 112 are at the low level, so that the outputs of the AND circuits 113 and 114 are low level and the relays 13 and 14 are turned off. As a result, the supply of power to the headlamp ECUs 41 and 51 is interrupted, and the left and right headlamps 42 and 52 are turned off.

Next, the operation at a time when the relay control circuit 11 has a fault will be described. When the relay control circuit 11 has a fault, the backup circuit 12 supplies power to the headlamp ECU 51. When the ignition of the vehicle is on, the output of the backup circuit 12 becomes the high level or the low level according to the state of the column switch 20. Then, the relay 14 is turned on or off to control the power supply to the headlamp ECU 51, and the right headlamp 52 is turned on or off.

In a case where the transmission of the driving signal is interrupted due to a disconnection of the wire harness connecting the control ECU 30 and the power supply circuit 10, if the ignition of the vehicle is on, the power supply circuit 10 operates in a manner similar to a case where the ignition of the vehicle is on in the normal state. That is, since the outputs of the OR circuit 111 and the OR circuit 112 are at the high level, the outputs of the AND circuits 113 and 114 are at the high level if the predetermined conditions are satisfied. As a result, the relays 13 and 14 are turned on, power is supplied to the headlamp ECUs 41 and 51, and the left and right headlamps 42 and 52 are turned on.

When the communication between the circuit connected to the ignition power supply and the power supply circuit 10 is interrupted due to a disconnection, the power supply circuit 10 operates according to the driving signal transmitted from the control ECU 30 in the same manner as when the ignition is off in the normal state. That is, when the driving signal is at the high level, if the predetermined conditions are satisfied, the relays 13 and 14 are turned on, power is supplied to the headlamp ECUs 41 and 51, and the left and right headlamps 42 and 52 are turned on. When the driving signal is at the low level, the relays 13 and 14 are turned off, the supply of power to the headlamp ECUs 41 and 51 is interrupted, and the left and right headlamps 42 and 52 are turned off.

Figure 2:
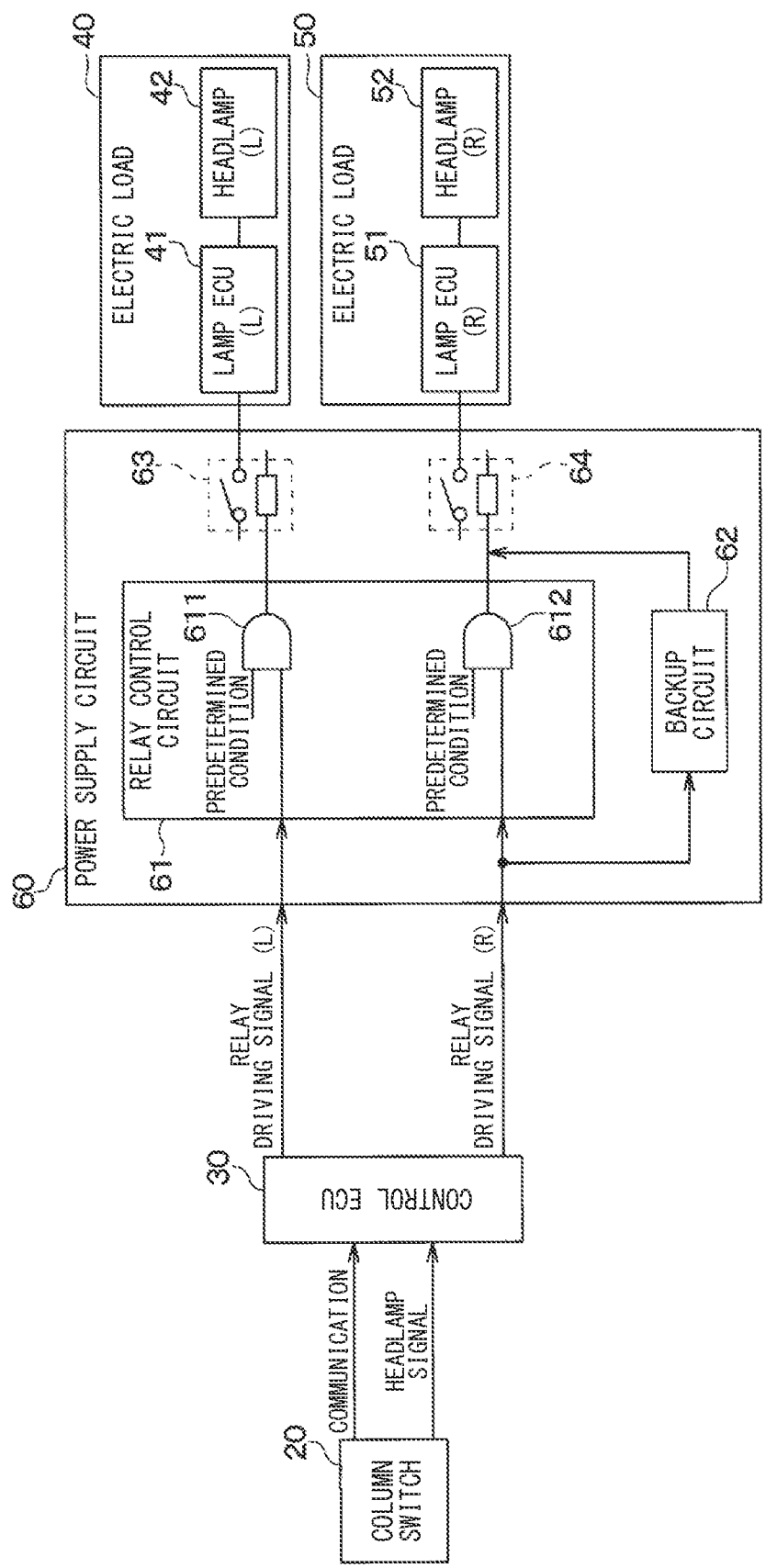
FIG. 2 is a block diagram of a power supply circuit according to a comparative example.

FIG. 2 is a diagram showing a power supply circuit 60 according to a comparative example. The power supply circuit 60 shown in FIG. 2 includes a relay control circuit 61, a backup circuit 62, a relay 63, and a relay 64. The signal transmitted from the control ECU 30 to the power supply circuit 10 is input to the relay control circuit 61 and the backup circuit 62.

The relay control circuit 61 switches the relay 63 and the relay 64 on and off according to the signal transmitted from the control ECU 30. The backup circuit 62 is configured to switch the relay 64 on and off according to the signal transmitted from the control ECU 30. The relays 63 and 64 switch the power supply to the headlamp ECUs 41 and 51 on and off, respectively, and are arranged so as to open and close the connection between a power supply (not shown) and the headlamp ECUs 41 and 51.

The relay control circuit 61 turns on the relays 63 and 64 to supply power to the headlamp ECUs 41 and 51 when the column switch 20 instructs the lighting of the headlamps.

Specifically, the relay control circuit 61 includes an AND circuit 611 and an AND circuit 612. Two input terminals of the AND circuit 611 are connected to a control ECU 30 and a sensor ECU (not shown), respectively. Then, when the signal instructing the lighting of the headlamp 42 is input from the control ECU 30 and a predetermined condition is satisfied, an output of the AND circuit 611 becomes a high level. As a result, the relay 63 is turned on, power is supplied to the headlamp ECU 41, and the left headlamp 42 is turned on.

Similarly, two input terminals of the AND circuit 612 are connected to the control ECU 30 and a sensor ECU (not shown), respectively. Then, when the signal instructing the lighting of the headlamp 52 is input from the control ECU 30 and a predetermined condition is satisfied, an output of the AND circuit 612 becomes a high level. As a result, the relay 64 is turned on, power is supplied to the headlamp ECU 51, and the right headlamp 52 is turned on.

An output of the backup circuit 62 becomes a high level when the signal instructing the lighting of the headlamp 52 is input from the control ECU 30 and a predetermined condition is satisfied. As a result, the relay 64 is turned on, power is supplied to the headlamp ECU 51, and the right headlamp 52 is turned on.

The power supply circuit 60 is connected to the control ECU 30 by two wire harnesses, and driving signals for turning on or off the left and right headlamps 42 and 52 are transmitted through the two wire harnesses.

Specifically, one of the wire harnesses is connected to the AND circuit 611, and the driving signal for driving the relay 63 to supply power to the headlamp ECU 41 is transmitted via the wire harness. The other wire harness is connected to the AND circuit 612, and the driving signal for driving the relay 64 to supply power to the headlamp ECU 51 is transmitted via the other wire harness.

In this comparative example, when the high-level driving signals are input from the control ECU 30 to the power supply circuit 60 and the predetermined conditions are satisfied, the outputs of the AND circuits 611 and 612 become the high level, and the relays 63 and 64 are turned on. As a result, power is supplied to the headlamp ECUs 41 and 51, and the left and right headlamps 42 and 52 are turned on. On the other hand, when the low-level driving signals are input from the control ECU 30 to the power supply circuit 60, or when the predetermined conditions are not satisfied, the outputs of the AND circuits 611 and 612 become the low level, and the relays 63 and 64 are turned off. As a result, the supply of power to the headlamp ECUs 41 and 51 is interrupted, and the left and right headlamps 42 and 52 are turned off.

When the relay control circuit 61 has a fault, the backup circuit 62 supplies power to the headlamp ECU 51. That is, when the high level driving signal is input from the control ECU 30 to the power supply circuit 60 and the predetermined condition is satisfied, the output of the backup circuit 62 becomes the high level and the relay 64 is turned on. As a result, power is supplied to the headlamp ECU 51, and the right headlamp 52 is tuned on. On the other hand, when the low-level driving signal is input from the control ECU 30 to the power supply circuit 60, or when the predetermined condition is not satisfied, the output of the backup circuit 62 becomes the low level and the relay 64 is turned off. As a result, the supply of power to the headlamp ECU 51 is interrupted, and the right headlamp 52 is turned off.

In a case where one of the two wire harnesses connecting the control ECU 30 and the power supply circuit 60 is disconnected and the supply of power to one of the headlamp ECU 41 and 42 is interrupted, the driving signal is transmitted only via the other wire harness, and power is supplied to the other of the headlamp ECU 41 and 42.

As described above, in the comparative example shown in FIG. 2, a fail-safe is ensured by providing driving signal transmission paths from the control ECU 30 and the power supply paths to the headlamp ECUs separately on the left and right. However, in order to provide the driving signal transmission paths from the control ECU 30 separately on the left and right, two wire harnesses for connecting the control ECU 30 and the power supply circuit 60 are required.

On the other hand, in the present embodiment, the relay control circuit 11 determines whether the ignition is on or off, and when the ignition is on in the normal state, if the predetermined conditions are also satisfied, power is supplied to the headlamp ECUs 41 and 51, and the left and right headlamps 42 and 52 are turned on.

In this way, when the ignition is on in the normal state, the states of the headlamps 42 and 52 are controlled regardless of the state of the column switch 20, so that the wire harness connecting the control ECU 30 and the power supply circuit 10 can be only one for redundancy. Therefore, it is possible to simplify the arrangement of the wire harness and reduce the cost without changing the configurations of the existing headlamp ECU and control ECU.

OTHER EMBODIMENTS

The present disclosure is not limited to the above embodiment, and can be appropriately modified within the scope described in the claims. Individual components or features of the above-described embodiment are not necessarily essential unless it is specifically stated that the components or the features are essential in the foregoing description, or unless the components or the features are obviously essential in principle. The numerical value such as the number, the numerical value, the quantity, the range, or the like of components mentioned in the above-described embodiment is not limited to a specific number unless specified as being required, clearly limited to such a specific number in principle, or the like. The shape, the positional relationship, and the like of components or the like mentioned in the above-described embodiment are not limited to those being mentioned unless otherwise specified, limited to specific shape, positional relationship, and the like in principle, or the like.

For example, in the above-described embodiment, the relay control circuit 11 is operated by the OR circuit 111, the OR circuit 112, the AND circuit 113, and the AND circuit 114 as described above, but may be operated in the same manner as the above-described embodiment by another configuration.

Further, in the above embodiment, the relays 13 and 14 are turned on when the outputs of the OR circuits 111 and 112 are at the high level and the predetermined conditions are satisfied, but the relays 13 and 14 may be switched on and off only by the outputs of the OR circuits 111 and 112 without using the predetermined conditions.

Further, in the above-described embodiment, the backup circuit 12 is used to switch the relay 14 on and off, but the backup circuit 12 may be used to switch the relay 13 on and off.

Further, in the above embodiment, the case of supplying power to the headlamp ECU has been described, but the present disclosure may be applied to a power supply circuit for supplying power to another electric load provided in the vehicle.

What is claimed is:

1. A power supply circuit for supplying power to an electric load of a vehicle, comprising:
   a relay configured to be turned on when enabling the supply of power to the electric load and configured to be turned off when interrupting the supply of power to the electric load; and
   a relay control circuit configured to control the relay, wherein
   the relay control circuit is further configured to turn on the relay when an ignition of the vehicle is on regardless of a state of an operation part that is to be operated by a driver to operate the electric load,
   the relay control circuit includes an OR gate circuit having a first input terminal and a second input terminal,
   the first input terminal of the OR gate circuit is configured to be connected to an ignition power supply of the vehicle, and
   the second input terminal of the OR gate circuit is configured to be connected to the operation part.

2. The power supply circuit according to claim 1, wherein the relay control circuit is further configured to turn on the relay when the ignition of the vehicle is on and a predetermined condition is satisfied.

3. The power supply circuit according to claim 1, wherein the relay control circuit is further configured to turn on the relay based on the state of the operation part when the ignition of the vehicle is off.

4. The power supply circuit according to claim 1, further comprising
   a backup circuit configured to control the relay according to the state of the operation part when the relay control circuit has a fault, wherein
   the relay is further configured to be turned on or off also by the backup circuit.

5. The power supply circuit according to claim 1, wherein
   the electric load includes a left headlamp and a right headlamp,
   the relay includes two relays configured to be connected to the left headlamp and the right headlamp, respectively,
   the operation part is a switch for controlling states of the right headlamp and the left headlamp,
   the relay control circuit is configured to be connected to the switch via a control ECU, and
   the relay control circuit is configured to be connected to the control ECU by one wire harness.

* * * * *